US008705509B2

(12) United States Patent
Kuwabara (10) Patent No.: US 8,705,509 B2
(45) Date of Patent: Apr. 22, 2014

(54) TIME SYNCHRONIZER

(75) Inventor: Kaoru Kuwabara, Tokyo (JP)

(73) Assignee: NEC Corporation, Tokyo (JP)

( * ) Notice: Subject to any disclaimer, the term of this patent is extended or adjusted under 35 U.S.C. 154(b) by 583 days.

(21) Appl. No.: 12/997,324

(22) PCT Filed: Jun. 1, 2009

(86) PCT No.: PCT/JP2009/060404
§ 371 (c)(1),
(2), (4) Date: Dec. 10, 2010

(87) PCT Pub. No.: WO2009/157296
PCT Pub. Date: Dec. 30, 2009

(65) Prior Publication Data
US 2011/0085540 A1    Apr. 14, 2011

(30) Foreign Application Priority Data

Jun. 23, 2008  (JP) ................................. 2008-162647

(51) Int. Cl.
*H04J 3/06*     (2006.01)
*H04L 12/26*    (2006.01)
*H04W 4/00*     (2009.01)

(52) U.S. Cl.
USPC ........................... 370/350; 370/252; 370/331

(58) Field of Classification Search
USPC .......................................... 370/350, 352, 331
See application file for complete search history.

(56) References Cited

U.S. PATENT DOCUMENTS

| 6,151,311 A | 11/2000 | Wheatley, III et al. |
| 7,342,972 B1 | 3/2008 | Giannakis et al. |
| 2001/0022779 A1* | 9/2001 | Wheatley et al. ............. 370/252 |
| 2005/0128980 A1* | 6/2005 | Han et al. ...................... 370/331 |
| 2006/0280226 A1 | 12/2006 | Krasner |

FOREIGN PATENT DOCUMENTS

| CN | 101098185 A | 1/2008 |
| JP | 11-154920 A | 6/1999 |
| JP | 2000332678 A | 11/2000 |
| JP | 2000357988 A | 12/2000 |

(Continued)

OTHER PUBLICATIONS

International Search Report for PCT/JP2009/060404 mailed Sep. 8, 2009.

(Continued)

*Primary Examiner* — Ian N Moore
*Assistant Examiner* — Kiet Tang
(74) *Attorney, Agent, or Firm* — Sughrue Mion, PLLC (57) ABSTRACT

An object of this invention is to realize stable control in a time synchronizer utilizing GPS satellites so that a long operational time is ensured for the system even if any of the GPS satellites becomes unable to be captured. When a base station becomes unable to capture any of the GPS satellites and if there is a mobile station which is in a relationship capable of performing handover from the base station to another base station, a radio wave input/output unit receives a frame transmitted by the other base station being able to normally receive the GPS satellite via the mobile station, and a frame timing detection unit estimates a deviation from the UTC. A 1PPS correction circuit unit transmits a signal to correct the deviation, and a control unit causes a GPS receiver to change and adjust the frame timing. A frame generation unit generates a frame based on the corrected 1PPS signal.

6 Claims, 4 Drawing Sheets

(56) References Cited

FOREIGN PATENT DOCUMENTS

| | | | |
|---|---|---|---|
| JP | 2001517892 A | 10/2001 | |
| JP | 2002505542 A | 2/2002 | |
| JP | 3379698 B | 2/2003 | |
| JP | 2005236529 A | 9/2005 | |
| JP | 2005318196 A | 11/2005 | |
| JP | 2007228327 A | 9/2007 | |
| TW | 200704222 | 1/2007 | |

OTHER PUBLICATIONS

Chinese Office Action for CN200980124004.8 dated Dec. 5, 2012.
Japanese Office Action for JP2008-162647 dated Nov. 2, 2012.
Taiwanese Office Action for TW098120851 dated on Mar. 1, 2013.

* cited by examiner

TIME SYNCHRONIZER

TECHNICAL FIELD

This invention relates to a time synchronizer, and particularly to a time synchronizer for use in a base station which relays communication between mobile stations under clock synchronization based on time signals received from GPS communication satellites.

BACKGROUND ART

A mobile communication system includes a plurality of base stations each having a service area (cell) and a mobile station moving in the service area (cell). In this type of mobile communication system, a GPS (Global Positioning system) receiver is used to achieve synchronization between the base stations. In other words, this method of synchronizing the base stations (system for synchronizing the base stations) is a method (system) in which the plurality of base stations receive UTC (Coordinated Universal Time) from the GPS and achieve synchronization according to the UTC time received by both or one of them.

In some of the base stations, the GPS receiver provided in the base station may not be able to capture any of the GPS communication satellites and thus the relevant base station may not be locked to the UTC time. This state is called "the GPS unlocked state" in this field of technology. Various time synchronizers have been proposed, which are designed to be able to achieve synchronization between base stations even in the GPS unlocked state.

For example, Japanese Unexamined Patent Application Publication No. H11-154920 (hereafter, referred to as "Patent Document 1") discloses a clock synchronization method for a synchronous base station control system designed such that clock synchronization for the synchronous base station control system can be maintained more correctly even when a time signal cannot be received from any of GPS communication satellites. According to the clock synchronization method disclosed in Patent Document 1, if the base stations are capable of receiving a time signal from any of the GPS communication satellites, the base stations receive a GPS time signal to produce a PPS (Pulse Per Second) signal. The base stations generate a PPS clock based on this PPS signal to thereby perform clock synchronization. In contrast, if the base stations are not capable of receiving a time signal from any of the GPS communication satellites, clock synchronization is performed based on RTC (Real Time Clock) generated by the base stations. The PPS signal is generated even when a time signal cannot be received from the GPS communication satellites. The RTC is monitored whether or not it is in accord with the PPS clock, and if the RTC is not in accord with, it is corrected based on the PPS clock. A PSC (PPS Signal Counter) counting the RTCs and the PPS signals is initialized upon receiving the time signal.

Figure 1:
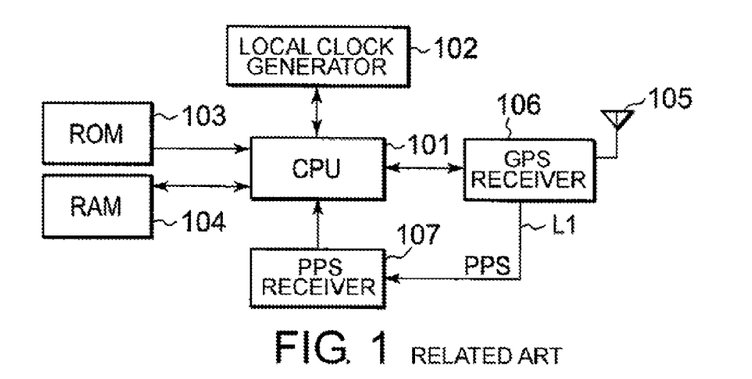
FIG. 1 is a block diagram showing an example of a time synchronizer according to a related art.

FIG. 1 is a block diagram showing a configuration of the time synchronizer disclosed in the above-mentioned Patent Document 1. The illustrated time synchronizer is composed of a central processing unit (CPU) 101, a local clock generator 102, a ROM (Read Only Memory) 103, a RAM (Random Access Memory) 104, a GPS antenna 105, a GPS receiver 106, and a PPS receiver 107.

The GPS receiver 106 receives a time signal provided by a GPS communication satellite at the GPS antenna 105 to produce a PPS signal and transmits the PPS signal to the PPS receiver 107 through a line L1. The PPS receiver 107 generates a PPS clock based on the PPS signal and provides this to the CPU 101. The PPS signal is a signal generated based on a time signal which is substantially equal to the standard time signal, and is provided every one seconds. Accordingly, as long as the time signal can be received from any of the GPS communication satellites, the CPU 101 is provided with a PPS clock at accurate timing, whereby the clock synchronization can be maintained correctly.

The local clock generator 102 generates a RTC, and the RTC is monitored by the CPU 101 whether or not it is in accord with the PPS clock. If the RTC is not in accord with the PPS clock, it is corrected by a correction unit composed of the CPU 101, the ROM 103 and the RAM 104.

However, the above-mentioned related art illustrated in FIG. 1 has problems as described below.

A first problem is that correct time cannot be obtained if the base stations face a situation in which they cannot capture any of the GPS communication satellites. The reason is as follows. When the base stations come into a situation in which they cannot capture any of the GPS communication satellites, the system-side clock is corrected by seconds by means of the RTC. However, the RTC itself is a circuit designed based on an accuracy of about one second. Therefore, according to this method, if a system is configured to operate in synchronization with the UTC (Coordinated Universal Time), the system can only be corrected at an accuracy of about one second.

A second problem is that the correct accuracy can be maintained only at a level of seconds. This is because the system is designed such that correct time is obtained by correcting the RTC by comparing a PSC (PPS Signal Counter) value obtained by counting, per second, PPS signals output from the time synchronizer utilizing the GPS communication satellites with the information in seconds of the RTC clock.

Additionally, Japanese Patent No. 3,379,698 (hereafter, referred to as "Patent Document 2") discloses an inter-base-station synchronization system in which a system clock is synchronized with the UTC time even in the GPS unlocked state. In the inter-base-station synchronization system disclosed in Patent Document 2, each of base stations comprises a GPS receiver receiving its own UTC time from any of GPS communication satellites, a clock generator generating a clock signal in synchronism with its UTC time, a computing unit computing a delay correction time according to delay time between its UTC time and another UTC time received from another base station through a transmission channel, and a memory unit for storing the traffic state of the transmission channel and the delay correction time. Each of the base stations generates a clock signal synchronized by adding the delay correction time to the above-mentioned another UTC time when it cannot capture its UTC time from any of the GPS communication satellites. The above-mentioned delay correction time is computed and output based on a difference between its own UTC time and another UTC time locked by another base station via the transmission channel when locked to its UTC time.

In the inter-base-station synchronization system disclosed in Patent Document 2, other UTC times must be periodically received from another base station via a transmission channel to compute a delay correction time.

Japanese Unexamined Patent application Publication No. 2000-332678 (hereafter, referred to as "Patent Document 3") discloses a synchronization maintenance method according to which in a state in which synchronized time information cannot be acquired from any of GPS satellites, synchronization can be maintained with a high accuracy and a mobile station which is not connected is allowed to hold synchronized time. According to the synchronization maintenance method disclosed in Patent Document 3, in the case in which synchronized time information cannot be received from any of the GPS satellites, a phase difference between a received GPS time clock and an internally generated clock is detected, and the phase of the internally generated clock is controlled to eliminate the phase difference, so that synchronization is performed using the controlled clock.

According to the synchronization maintenance method disclosed in Patent Document 3, it is not known how the GPS time is received when the synchronized time information cannot be received from any of the GPS satellites.

Japanese Unexamined Patent Application Publication No. 2005-318196 (hereafter, referred to as "Patent Document 4") discloses an inter-base-station synchronization system in which synchronization can be achieved among base stations even if the delay time in transmission channels among the base stations fluctuates. In the inter-base-station synchronization system disclosed in Patent Document 4, a base station to be clock synchronized with a plurality of other base stations comprises a time information receiving unit, an input unit, a delay time detection unit, a memory unit, an input clock signal monitoring unit, and a clock signal generation unit. The time information receiving unit receives time information from any of satellites to generate its own clock signal using the received time information. The input unit inputs clock signals from at least two other base stations as input clock signals. The delay time detection unit detects delay time of each of the input clock signals with respect to its own clock signal by using its own clock signal generated by the time information receiving unit and the input clock signals inputted by the input unit. The memory unit stores the delay time detected by the delay time detection unit. The clock signal monitoring unit monitors each of the input signals inputted by the input unit to detect variation in the input clock signals.

The inter-base-station synchronization system disclosed in Patent Document 4 requires constant monitoring of variation in the input clock signals.

DISCLOSURE OF THE INVENTION

It is an object of this invention to provide a time synchronizer capable of producing a PPS signal (=time synchronization signal) which is stable for a long period of time even in a state in which any of GPS communication satellites cannot be captured.

It is another object of this invention to provide a time synchronizer capable of reducing the cost required for maintaining the stability at the same level for time synchronization signals.

A time synchronizer according to this invention is designed such that, when the time synchronizer cannot capture any of GPS communication satellites for some reason, correct time information is obtained from another time synchronizer capable of receiving normally from any of the GPS communication satellites via a mobile station located between the time synchronizers to correct a predetermined delay time, whereby the time synchronizer is allowed to function as a time synchronizer as long a period as possible even in a state in which any of the GPS communication satellites cannot be captured.

Specifically, the time synchronizer according to a this invention is a time synchronizer for use in a base station relaying communication between mobile stations under clock synchronization based on a time signal received from any of GPS communication satellites. The time synchronizer is characterized by comprising a circuit which, when a base station becomes unable to capture any of the GPS communication satellites, acquires from another base station which is in the handover state, via a mobile station, time information of a time signal received by the another base station from any of the GPS communication satellites; and a circuit for performing its own clock synchronization based on the acquired time information.

An advantageous effect of this invention resides in that a long-term operational time is ensured for the system without altering a basic configuration of a conventional time synchronizer utilizing the GPS communication satellites, even if any of the GPS communication satellites becomes unable to be captured. This can be realized by computing the UTC timing of the base station which has become unable to capture any of the GPS communication satellites based on frame data from another base station capable of normally receiving from any of the GPS communication satellites and performing correction adjustment thereon.

BEST MODE FOR CARRYING OUT THE INVENTION

Exemplary embodiments of this invention will be described in detail with reference to the drawings.

[Description of Configuration]

A base station comprising a time synchronizer according to this invention relays communication between mobile stations under clock synchronization.

Figure 2:
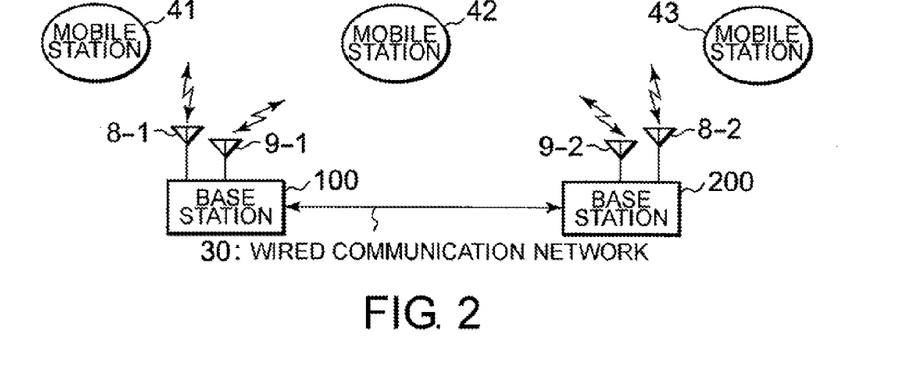
FIG. 2 is a diagram showing an example of positional relationship among two base stations and mobile stations.

FIG. 2 is a block diagram showing a mobile communication system including a base station comprising a time synchronizer according to the invention. FIG. 2 illustrates an example of positional relationship among two such base stations and mobile stations. The illustrated mobile communication system comprises first and second base stations 100 and 200, and first through third mobile stations 41, 42, and 43. The first base station 100 and the second base station 200 are mutually connected through a wired communication network 30. The first base station 100 comprises a first GPS antenna 8-1 and a first communication antenna 9-1. Likewise, the second base station 200 comprises a second GPS antenna 8-2 and a second communication antenna 9-2.

FIG. 2 shows a state as described below. Specifically, the first base station 100 relays communication between the first mobile station 41 and the second mobile station 42 via the first communication antenna 9-1. The second base station 200 relays communication between the second mobile station 42 and the third mobile station 43 via the second communication antenna 9-2. Accordingly, in the illustrated example, the second mobile station 42 is located in a transmittable and receivable area (handover area) between the first and second base stations 100 and 200.

The mobile communication system shown in FIG. 2 performs clock synchronization in a manner as follows. The first base station 100 and the second base station 200 receive a time signal by means of the first GPS antenna 8-1 and the second GPS antenna 8-2, respectively, from any of GPS communication satellites (hereafter referred to as the "GPS satellites"). Clock synchronization is performed between the first base station 100 and the second base station 200 based on this time information. This time signal is synchronized with the UTC (Coordinated Universal Time) with a very high accuracy.

Figure 3:
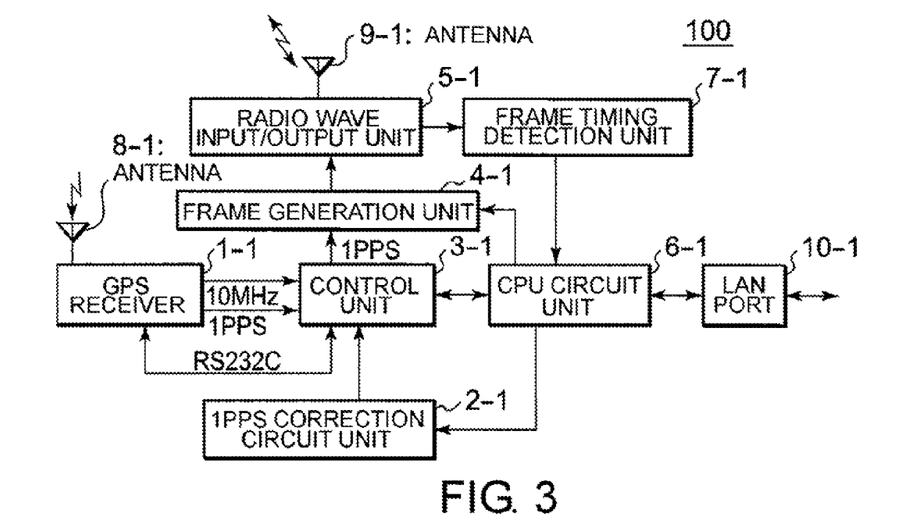
FIG. 3 is a block diagram showing a configuration of a time synchronizer according to an embodiment of this invention.

FIG. 3 is a block diagram showing a configuration of the first base station (time synchronizer) 100 according to an embodiment of this invention. The second base station 200 has the same configuration as that of the first base station 100 shown in FIG. 3. Therefore, the following description will be made of the first base station 100 as the representative example.

The first base station 100 comprises a first GPS receiver 1-1, a first 1PPS correction circuit unit 2-1, a first control unit 3-1, a first frame generation unit 4-1, a first radio wave input/output unit 5-1, a first CPU circuit unit 6-1, a first frame timing detection unit 7-1, the first GPS antenna 8-1, the first communication antenna 9-1, and a first LAN port 10-1. The first GPS antenna 8-1 is for capturing the GPS satellites, and the first communication antenna 9-1 is for wireless connection.

Although it is not shown in the drawings, the components of the second base station 200 are indicated by the same reference numerals but with a suffix of "2" instead of "1". Specifically, the second base station 200 comprises a second GPS receiver 1-2, a second 1PPS correction circuit unit 2-2, a second control unit 3-2, a second frame generation unit 4-2, a second radio wave input/output unit 5-2, a second CPU circuit unit 6-2, a second frame timing detection unit 7-2, the second GPS antenna 8-2, the second communication antenna 9-2, and a second LAN port 10-2. The second GPS antenna 8-2 is for capturing a GPS satellite, and the second communication antenna 9-2 is for wireless connection.

The first GPS receiver 1-1 acquires positional information, GPS satellite information, time information (including a time signal) and so on by receiving information from any of GPS satellites via the first GPS antenna 8-1 and internally processing the received information. After the internal processing, the first GPS receiver 1-1 produces a 10-MHz clock (hereafter, simply referred to as "clock") and a 1PPS (1 Pulse Per Second) signal to the first control unit 3-1. Further, once the first GPS receiver 1-1 becomes unable to receive the time signal, it transmits alarm information to the first control unit 3-1.

The first control unit 3-1 operates in synchronization with clocks. The first control unit 3-1 is capable of receiving various types of status information and alarm information from the first GPS receiver 1-1 via RS-232C (serial communication). In order to change the state or status of the first GPS receiver 1-1, the first control unit 3-1 is connected to the first GPS receiver 1-1 via RS-232C such that setting or the like of the first GPS receiver 1-1 can be changed.

The first control unit 3-1 transmits, in its normal state, the 1PPS signal received from the first GPS receiver 1-1 to the first frame generation unit 4-1. However, upon receiving alarm information from the first GPS receiver 1-1, the first control unit 3-1 makes request to the first CPU circuit unit 6-1 to start timer operation. If there is no base station to which handover is possible within a predetermined time, the first control unit 3-1 stops the wireless output. In contrast, if there exists a base station to which handover is possible within the predetermined time, the first control unit 3-1 compares the timing of the 1PPS signal at that base station calculated by the first CPU circuit unit 6-1 and the timing of the 1PPS signal from the first GPS receiver 1-1. Further, the first control unit 3-1 is connected so as to be able to receive correction information (correction phase amount) from the first 1PPS correction circuit unit 2-1 and to transmit the correction information to the first GPS receiver 1-1. Further, the first control unit 3-1 is connected so as to be able to output the corrected 1PPS signal from the first GPS receiver 1-1 to the first frame generation unit 4-1.

The term "handover" indicates an operation in which, for example, when a mobile station is present in an area (handover area) where transmission and reception are possible between a plurality of base stations, the base station to perform communication is changed from the one with which the mobile station is currently communicating to another base station with which the mobile station is not communicating.

Figures 4, 5:
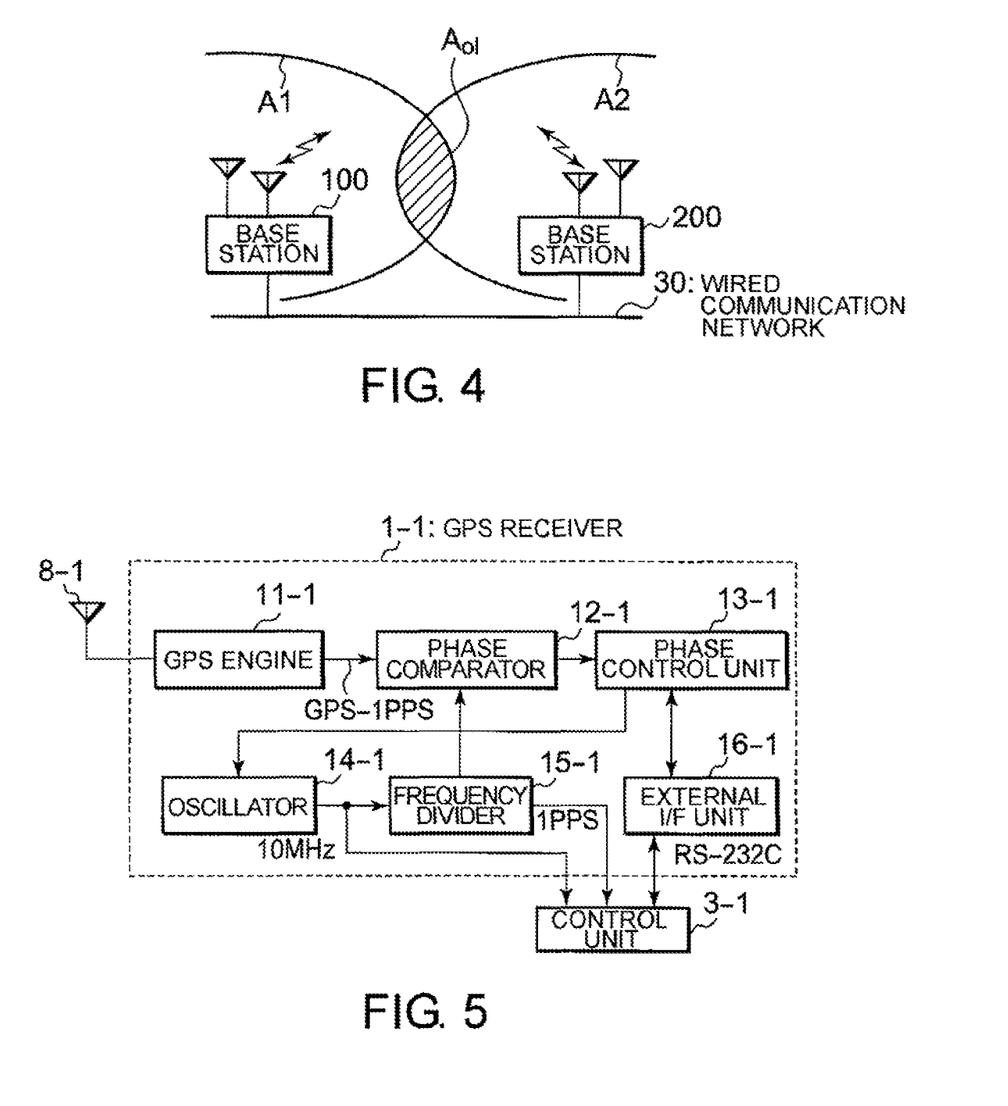
FIG. 4 is a diagram for explaining a handover area.
FIG. 5 is a block diagram showing a detailed example of a GPS receiver in the time synchronizer shown in FIG. 3.

Referring to FIG. 4, description will be made of the handover area. A radio wave arrival distance from a base station to a mobile station is determined according to transmission power of the base station and performance of the receivers. The transmittable/receivable range between the first base station 100 and the mobile station determined according to these is indicated as a first radio wave arrival range A1 from the first base station 100, and the transmittable/receivable between the second base station 200 and the mobile station is indicated as a second radio wave arrival range A2 from the second base station 200. These first and second radio wave arrival ranges A1 and A2 overlap with each other so that the mobile station is allowed to perform communication without interruption. In FIG. 4, the shaded area corresponds to this overlapped region. The first base station 100 and the second base station 200 are connected by the wired communication network 30 such as a LAN network (see FIG. 2) in order to obtain positional information of the mobile stations and to perform communication with a host network or the like. As described above, in the example shown in FIG. 2, the second mobile station 42 is located in the overlapped area $A_{o1}$.

The first frame generation unit 4-1 generates a frame on the basis of the 1PPS signal received from the first control unit 3-1. The generated frame is sent to the first radio wave input/output unit 5-1. The first radio wave input/output unit 5-1 wirelessly outputs the frame input from the first frame generation unit 4-1 to the mobile station or to another base station from the first communication antenna 9-1. This means that communication is performed with the mobile station or another base station by means of this frame. A frame wirelessly output by another base station and received by the first communication antenna 9-1 is sent to the first frame timing detection unit 7-1 via the first radio wave input/output unit 5-1. The first frame timing detection unit 7-1 detects timing information in the frame and sends it to the first CPU circuit unit 6-1.

Upon receiving a request for starting timer operation from the first control unit 3-1, the first CPU circuit unit 6-1 searches for a base station to which handover is possible within a certain period of time. If there is no such base station, the first CPU circuit unit 6-1 stops generation of frames in the first frame generation unit 4-1. In contrast, if there is a base station to which handover is possible, the first CPU circuit unit 6-1 requests all the base stations to provide handover information, via the first LAN port 10-1. The host of the first base station 100 determines a base station to be handed over (the second base station 200 in this example).

Further, the first CPU circuit unit 6-1 receives various data wirelessly and over wire from the second base station 200. These data include information that the second base station 200 is being handed over and timing information to be used as time information. The first CPU circuit unit 6 computes a total delay time in data transmission from the second base station 200 to the first base station 100 via the second mobile station 42 on the basis of the positional information among the mobile station, the first base station 100 and the second base station 200, and computes the timing of the 1PPS signal in the second base station 200 based on the time information contained in the received frame.

Further, the first CPU circuit unit 6-1 controls frame generation in the first frame generation unit 4-1 under the control by the first control unit 3-1. Based on the comparison result of the 1PPS signal from the first control unit 3-1, the first CPU circuit unit 6-1 computes a phase difference between the first 1PPS signal in the first base station 100 and the second 1PPS signal in the second base station 200, and transmits the computed phase difference to the first 1PPS correction circuit unit 2-1. The first 1PPS correction circuit unit 2-1 computes a correction phase amount based on the above-mentioned phase difference and transmits the computed correction phase amount to the first control unit 3-1.

As described above, once the base station becomes unable to capture any of the GPS communication satellites, the first CPU circuit unit 6-1 serves as a circuit for acquiring time information of a time signal which another base station (second base station 200), which is being handed over, receives from any of the GPS communication satellites, from the other base station (second base station 200) via the mobile station (second mobile station 42). The first 1PPS correction circuit unit 2-1 serves as a circuit for performing synchronization on its own clock according to the acquired time information.

FIG. 5 is a block diagram showing in detail a configuration of the first GPS receiver 1-1 illustrated in FIG. 3. The first GPS receiver 1-1 comprises a first GPS engine 11-1, a first phase comparator 12-1, a first phase control unit 13-1, a first oscillator 14-1, a first frequency divider 15-1, and a first external I/F unit 16-1.

Although not shown in the drawings, the second GPS receiver 1-2 comprises a second GPS engine 11-2, a second phase comparator 12-2, a second phase control unit 13-2, a second oscillator 14-2, a second frequency divider 15-2, and a second external I/F unit 16-2.

Upon receiving a time signal from the first GPS antenna 8-1, the first GPS engine 11-1 generates a GPS_1PPS. The first oscillator 14-1 generates a 10-MHz clock. This clock is transmitted to the first frequency divider 15-1 and the first control unit 3-1. The first frequency divider 15-1 generates a 1PPS signal based on the clock. The generated 1PPS signal is transmitted to the first phase comparator 12-1 and the first control unit 3-1. The first phase comparator 12-1 compares the phases of the GPS_1PPS and the 1PPS signal, and sends a comparison result to the first phase control unit 13-1.

The first phase control unit 13-1 is connected to the first oscillator 14-1 so that the clock phase can be adjusted according to the phase comparison result. If the GPS_1PPS signal cannot be recognized according to the phase comparison result even after elapse of a predetermined time, the first phase control unit 13-1 determines that the time signal cannot be received and conveys information of this effect to the first external I/F unit 16-1. The first external I/F unit 16-1 performs communication of various data with the first control unit 3-1 by means of RS-232C. The first external I/F unit 16-1 is designed so as to be able to send a control command to the first phase control unit 13-1 upon receiving the information from the first phase control unit 13-1.

[Description of Operation]

Next, operation of the time synchronizer shown in FIG. 3 will be described with reference to the flowchart of FIG. 6.

Although the first base station 100 is actually capable of communicating with many base stations, it is assumed here, for the purpose of simplifying the description, that the first base station 100 and the second base station 200 are capable of communicating via the second mobile station 42, and the description is made focusing on operation of the first base station 100.

In the first GPS receiver 1-1 of the first base station 100, the first oscillator 14-1 generates a 10-MHz clock and transmits the clock to the first frequency divider 15-1 and the first control unit 3-1. The first frequency divider 15-1 generates a 1PPS signal based on this clock and transmits the 1PPS signal to the first phase comparator 12-1 and the first control unit 3-1. On the other hand, the first GPS engine 11-1 generates a GPS_1PPS upon receiving a time signal from the first GPS antenna 8-1, and transmits the GPS_1PPS to the first phase comparator 12-1. The first phase comparator 12-1 compares the phase of the GPS_1PPS with the phase of the 1PPS signal generated by the first frequency divider 15-1, and transmits the phase comparison result to the first phase control unit 13-1.

Likewise, in the second GPS receiver 1-2 of the second base station 200, the second oscillator 14-2 generates a 10-MHz clock and transmits the clock to the second frequency divider 15-2 and the second control unit 3-2. The second frequency divider 15-2 generates a 1PPS signal based on this clock, and transmits the 1PPS signal to the second phase comparator 12-2 and the second control unit 3-2. On the other hand, the second GPS engine 11-2 generates a GPS_1PPS upon receiving a time signal from the second GPS antenna 8-2, and transmits the GPS_1PPS to the second phase comparator 12-2. The second phase comparator 12-2 compares the phase of the GPS_1PPS with the phase of the 1PPS signal generated by the second frequency divider 15-2, and sends the phase comparison result to the second phase control unit 13-2.

It is assumed that in the first phase control unit 13-1, the GPS_1PPS can be recognized based on the result of the phase comparison by the first phase comparator 12-1. In this case, the first base station 100 is being able to capture any of the GPS satellites (YES in step S1 of FIG. 6), and hence a normal operation mode is assumed (step S9 of FIG. 6). In the normal operation mode, no information is transmitted from the first phase control unit 13-1 to the first control unit 3-1 via the first external I/F unit 16-1.

The first control unit 3-1 sends the 1PPS signal (not corrected) received from the first frequency divider 15-1 to the first frame generation unit 4-1. The first frame generation unit 4-1 generates a frame on the basis of the 1PPS signal received from the first control unit 3-1. The generated frame is sent to the first radio wave input/output unit 5-1, and is radiated from the first communication antenna 9-1 so that relay of the second mobile station 42 is performed by exchanging the frame between the first base station 100 and the second base station 200. Any clock phase shift between the base stations is corrected by the phase comparison between the GPS_1PPS and the 1PPS signal by the first phase comparator 12-1 and the phase control on the first oscillator 14-1 by the first phase control unit 13-1. This makes it possible to maintain the clock synchronization between the first base station 100 and the second base station 200.

The 1PPS signal is synchronized with the coordinated universal time (hereafter, referred to as the UTC) with a very high accuracy. For example, the 1PPS signal can be synchronized with the UTC within a range of ±100 nsec if an expensive double-oven oscillator is used as the first oscillator 14-1.

It is assumed that the GPS_1PPS cannot be recognized by the first phase control unit 13-1. In this case, it is considered that the first base station 100 cannot capture any of the GPS satellites for some reason (NO in step S1 of FIG. 6). In this case, the base station 100 transits to a Hold Over mode (step S2 of FIG. 6). The term "Hold Over" as used herein means a state in which as a result of the station 100 having become unable to capture any of the GPS satellites, a clock and a 1PPS signal are output to the first control unit 3-1 on the basis of the performance of the first oscillator 14-1 mounted in the first GPS receiver 1-1. In the Hold Over mode, the phase control as described above cannot be performed based on a time signal from any of the GPS satellites. As a result, the clock synchronization will be uniquely determined according to the performance of the first GPS receiver 1-1.

When the Hold Over mode is assumed, alarm information is notified from the first GPS receiver 1-1 to the first control unit 3-1 by means of serial communication. This notification is sent along the route, as shown in FIG. 5, starting from the first phase control unit 13-1, via the first external I/F unit 16-1 and RS-232C, and to the first control unit 3-1. Upon being triggered by the alarm information, the first control unit 3-1 requests the first CPU circuit unit 6-1 to start timer operation.

In response to the request to start timer operation, the first CPU circuit unit 6-1 activates its timer (step S3 of FIG. 6), and monitors whether or not timing information can be received from the first frame timing detection unit 7-1 within a certain period of time. Thus, it is sought whether or not the first base station 100 can receive the time signal that the second base station 200 is receiving from any of the GPS satellites by relaying the time signal through a mobile station. This means that a mobile station to which handover is possible is sought for.

Figure 7:
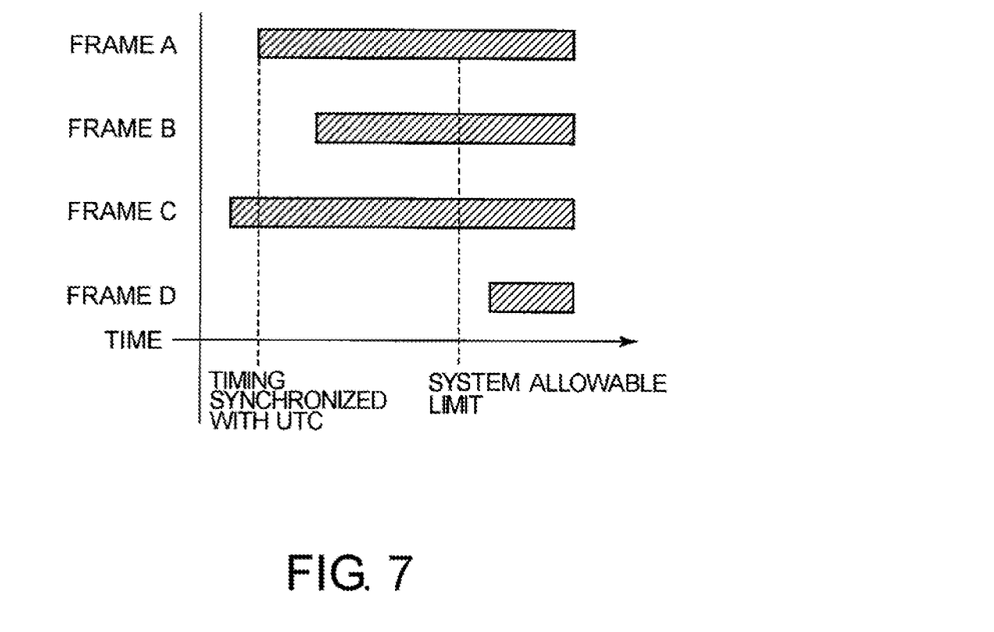
FIG. 7 is a relative relationship diagram showing time deviation of frames from the UTC time.

Referring to FIG. 7, description will be made on why a delay of a certain period of time is set before a mobile station to which handover is possible is searched for. The term "a certain period of time" in this case has the same meaning as the period of time for which the system can operate normally. The time performance that can be guaranteed depends largely on the performance of the first GPS receiver 1-1 itself. The allowable range varies depending upon envisaged system requirements. For example, if the IEEE 802.16e (hereafter, referred to as "WiMAX") standards are considered in terms of the system, it is believed that an accuracy of 10 μsec or less with respect to the UTC is required.

In FIG. 7, frame A represents a frame transmitted at a timing synchronized with the UTC, or at a timing when no time shift at all is generated. Frame B represents a timing of starting transmission of a frame signal transmitted by a base station which normally captures any of the GPS satellites and is in stable condition. Here, the temporal aspect is not completely the same as the UTC, but a sufficient time margin is ensured in terms of the system.

Like Frame B, frame C represents a timing at which a frame is transmitted from another base station which is operating normally. In this case, the temporal aspects ensures a sufficient margin in the same manner as in Frame B, but frame C is different from frame B in that the timing is set earlier with respect to the UTC. However, this early timing will not pose any problem since it is within the range allowed by the system. For example, when a double-oven oscillator is employed as the first oscillator 14-1, it is fully possible to achieve an accuracy of within ±100 nsec. As long as this accuracy is achieved, the system is at a level appropriately usable in the WiMAX as well.

Frame D represents a state in which any of the GPS satellites cannot be normally captured for some reason, the mode shifts to the Hold Over mode, and a time difference from the UTC is gradually generated until the time deviation has exceeded the allowable range for the system. The timings represented by frames A to D described above are supplied to the first CPU circuit unit 6-1 as timing information.

When the mode shifts to the Hold Over mode, a time difference from the UTC is generated with elapse of time since the frame phase is largely dependent on the performance of the first oscillator 14-1 within the first GPS receiver 1-1. For example, if the oscillator is of a double-oven type, it is capable of holding a deviation of 10 μsec or less from the UTC for 24 hours or more. In order to recognize such a state, the first control unit 3-1 requests the first CPU circuit unit 6-1 for timer operation to perform temporal management after the transition to the Hold Over mode.

Figure 6:
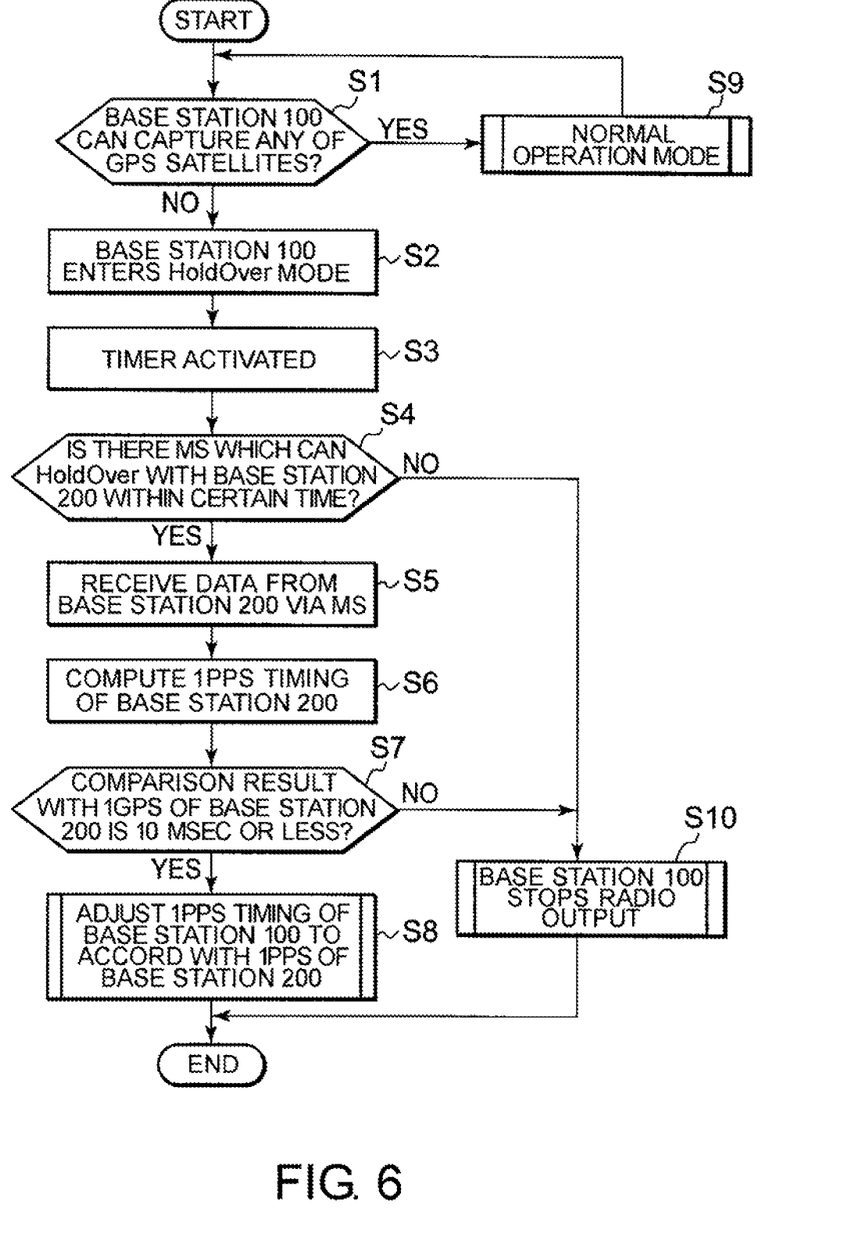
FIG. 6 is a flowchart for explaining operation of the time synchronizer shown in FIG. 3.

If there is no mobile station to which handover is possible within a certain period of time (NO in step S4 of FIG. 6), the first base station 100 shifts to the step to stop the wireless output (step S10 of FIG. 6). In this case, as shown in Frame D, the first CPU circuit unit 6-1 causes the first frame generation unit 4-1 to stop generating frames, since no timing information could be received from the first frame timing detection unit 7-1 within a certain period of time. As a result, the transmission of frames from the first radio wave input/output unit 5-1 is stopped. This is because clock synchronization cannot be maintained since a time signal cannot be received from any of the GPS satellites and a time signal cannot be received either from another base station through the relay of a mobile station.

In contrast, if there is a mobile station to which handover is possible within a certain period of time (YES in step S4 of FIG. 6), the first CPU circuit unit 6-1 requests all the base stations to provide handover information from the first LAN port 10-1 via the wired communication network 30. It is assumed here that the second base station 200 is in the handover state. In this case, the first base station 100 receives various data wired or wirelessly from the second base station 200 (step S5 of FIG. 6).

Specifically, the first CPU circuit unit 6-1 receives information that the second base station 200 is in the handover state from the second base station 200 via the first LAN port 10-1, and prepares to be able to receive radio waves from the second mobile station 42. The second base station 200 transmits, via the second mobile station 42, a frame which is presupposed to send time information to the first base station 100. This frame is generated by the second frame generation unit 4-2 in the second base station 200 on the basis of a 1PPS signal from the second control unit 3-2, radiated from the second communication antenna 9-2, and input to the first radio wave input/output unit 5-1 of the first base station 100. The second mobile station 42 transmits its own positional information at this time to the first base station 100. The time information of the above-mentioned frame transmitted from the second base station 200 to the second mobile station 42 is delivered to the wired communication network 30 at the same time with the frame, and sent to the first CPU circuit unit 6-1 via the first LAN port 10-1 of the first base station 100.

The first radio wave input/output unit 5-1 sends the received frame and the positional information of the second mobile station 42 to the first frame timing detection unit 7-1. The first frame timing detection unit 7-1 detects a frame timing, that is, timing information indicating at which timing the leading edge of the frame has been delivered. While there exist many pieces of such timing information including those from other base stations, the first CPU circuit unit 6-1 picks up frame data containing the same content as the data transmitted from the second base station 200 via the wired communication network 30.

The frame received by the first base station 100 via the second mobile station 42 reaches the first base station 100 after the lapse of the total delay time from the time at which the frame was transmitted by the second base station 200, the total delay time being obtained by adding a delay time in space wave propagation from the second base station 200 to the second mobile station 42, a delay time for retransmitting the received data within the inside of the second mobile station 42, and a delay time in space wave propagation from the second mobile station 42 to the first base station 100.

The first CPU circuit unit 6-1 computes a distance between the second mobile station 42 and the first base station 100 based on its own positional information and the positional information of the second mobile station 42, and computes a distance between the second mobile station 42 and the second base station 200 based on the positional information of the second mobile station 42 and the positional information of the second base station 200. The first CPU circuit unit 6-1 multiplies the distance thus obtained by the light velocity, and adds, to this multiplication result, a delay time for retransmitting data within the second mobile station 42, whereby the above-mentioned total delay time is computed. The first CPU circuit unit 6-1 then subtracts the computed total delay time from the frame timing detected by the first frame timing detection unit 7-1 to obtain the time timing transmitted by the second base station 200.

The first CPU circuit unit 6-1 matches the frame timing of the frame received via the second mobile station 42 with the time timing thus obtained, whereby a 1PPS timing synchronized with the GPS time signal in the second base station 200 is computed (step S6 of FIG. 6). The first control unit 3-1 compares this 1PPS timing with the timing of the 1PPS signal from the first frequency divider 15-1 (step S7 of FIG. 6).

If the phase difference is not 10 μsec or less as the result of the comparison (NO in step S7 of FIG. 6), the first CPU circuit unit 6-1 shifts to operation to stop the wireless output from the first base station 100 to cause the first base station 100 to stop its wireless output (step S10 of FIG. 6). This is because if radio waves are output at a timing largely different from the reference time, these radio waves may become disturbance waves for other base stations. The first CPU circuit unit 6-1 causes the first frame generation unit 4-1 to stop generating frames and, as a result, the transmission of frames from the first radio wave input/output unit 5-1 is stopped.

In contrast, if the phase difference is 10 μsec or less (YES in step S7 of FIG. 6), the first CPU circuit unit 6-1 sends the phase difference to the first 1PPS correction circuit unit 2-1. The first 1PPS correction circuit unit 2-1 computes a correction phase amount based on the phase difference and sends the computed correction phase amount to the first control unit 3-1. The first control unit 3-1 delivers correction information to the first GPS receiver 1-1 by means of serial communication through RS-232C. Upon receiving the correction information, the first external I/F unit 16-1 of the first GPS receiver 1-1 performs fine adjustment of the first oscillator 14-1 by the first phase control unit 13-1, so that the 1PPS is matched with a predetermined reference time (1PPS signal of the second base station 200) (step S8 of FIG. 6). The 1PPS signal which is fine-adjusted and output from the first frequency divider 15-1 is supplied to the first frame generation unit 4-1 via the first control unit 3-1 and used for generation of a frame.

When the first base station 100 becomes able to capture any of the GPS satellites (YES in step S1 of FIG. 6) while the first base station 100 is performing clock synchronization with the use of the 1PPS signal from the second base station 200, the first base station 100 returns to the normal operation mode (step S9 of FIG. 6).

In the manner as described above, even when the first base station 100 becomes unable to capture any of the GPS communication satellites for some reason, correction of the absolute time to transmit a frame is possible as long as a mobile station is present in the handover area with the second base station 200 connected to the wired communication network 30. By enabling this correction, the base station is allowed to communicate for a longer period of time than the performance of the first oscillator 14-1 itself of the first GPS receiver 1-1, and long-term stabilization of the base station is ensured. Furthermore, according to this embodiment, not so many components are added to those of a conventional base station, and hence the additional cost can be minimized.

More particular aspects of this invention will be described.

A time synchronizer according to this invention is a time synchronizer for use in a base station relaying communication between mobile stations under clock synchronization based on time signals received from any of GPS communication satellites, and is characterized by including: a frame timing detection unit for detecting timing information in a communication frame received by the communication; a GPS receiver which normally outputs a 1PPS signal and a clock synchronized with a time signal, whereas outputs alarm information when becoming unable to receive the time signal; a CPU circuit unit which normally outputs the 1PPS signal from the GPS receiver, whereas when the alarm information is output and there is a base station to which handover is possible, computes a timing of the 1PPS signal at the base station based on the timing information from the base station, and finds a phase difference based on a result of comparison with the timing of the 1PPS signal from the GPS receiver; a 1PPS correction circuit unit for computing a phase correction amount based on the phase difference; a control unit which normally output the 1PPS signal from the GPS receiver, whereas when alarm information is output, compares the computed timing of the 1PPS signal and the timing of the 1PPS signal from the GPS receiver, outputs the comparison result to the CPU circuit unit, and outputs 1PPS signal which is phase-corrected by the GPS receiver based on the phase correction amount; and a frame generation unit for generating a frame for the communication based on the 1PPS signal from the control unit.

Further, it is characterized in that if there is no base station to which handover is possible when the alarm information is output, the CPU circuit unit stops generation of frames in the frame generation unit.

Further, it is characterized in that the control unit causes the CPU circuit unit to operate its timer when the alarm information is output, and the CPU circuit unit determines whether or not there is a base station to which handover is possible within a predetermined period of time. A margin of a certain period of time is set because the search for presence of a base station to which handover is possible is started after waiting for the system to become normally operable. The time performance capable of ensuring the certain period of time largely depends on the performance of the GPS receiver itself, and the allowable range varies depending on envisaged system requirements.

Further, it is characterized in that the base stations are mutually wire-connected, so that transmission time information is obtained when time information of a time signal is acquired from the other base station. This makes it possible to compute the timing of the 1PPS signal more accurately.

Further, it is characterized in that, when the comparison result reveals that the phase difference exceeds a predetermined value, the control unit causes the CPU circuit unit to stop generation of frames in the frame generation unit. This is because if radio waves are output at a timing largely different from the reference time, these radio waves may become disturbance waves for other base stations.

Furthermore, the GPS receiver is characterized by being composed of: a GPS engine generating GPS_1PPS upon receiving a time signal from an antenna; an oscillator generating a clock to produce the clock to the control unit; a frequency divider generating an 1PPS signal based on the clock to produce the 1PPS signal to the control unit; a phase comparator comparing the phase of the GPS_1PPS and the phase of the 1PPS signal to produce a result of the phase comparison; and a phase control unit which is connected to the oscillator so that the phase of the clock can be adjusted according to the phase comparison result, exchanges various data communication and control commands with the control unit, and if the GPS_1PPS cannot be recognized based on the phase comparison result even after elapse of a predetermined period of time, generates alarm information, determining that the GPS receiver is not being able to receive the time signal.

Advantageous effects of the embodiments of this invention will be described. One of the advantageous effects of the embodiments of this invention resides in the fact that in a conventional time synchronizer using GPS communication satellites, an oscillator provided within a GPS receiver can be replaced with a lower-cost one. This is because although an expensive oscillator has conventionally been employed to achieve a predetermined accuracy for a period of time required by a system when the system is in the Hold Over mode, it is possible to use a lower-cost oscillator with slightly inferior performance since the UTC timing can be corrected. According to the embodiments of the invention, therefore, a comparable or higher accuracy can be ensured without using an expensive oscillator.

While the present invention has been particularly shown and described with reference to exemplary embodiments thereof, the invention is not limited to these embodiments. It will be understood by those ordinary skilled in the art that various changes in form and details may be made therein without departing from the sprit and scope of the present invention as defined by the claims.

For example, in the exemplary embodiments described above, it is determined to stop the wireless output of the first base station 100 on the condition that the deviation from the UTC is 10 μsec or less. However, in a system requiring an even higher absolute time. accuracy, the deviation may be one μsec or less. On the other hand, in a system not requiring a very high absolute time accuracy, the deviation may be 100 μsec or less.

Although in the exemplary embodiments described above, it is assumed that one base station is able to capture GPS signals, the base station capturing GPS signals may exist in plurality.

Although a GPS receiver is employed in the exemplary embodiments described above, a GLONASS (Global Navigation Satellite System) or a Galileo (European satellite positioning system) may be employed instead of the GPS, or a combination of GPS and GLONASS, GPS and Galileo, GLONASS and Galileo, or GPS, GLONASS and Galileo may be employed.

Although a double-oven oscillator is used as the first oscillator 14-1 in the exemplary embodiments described above, a single-oven oscillator may be used. However, in this case, the time until the deviation from the UTC exceeds a value allowed by the system becomes shorter. The cost can be reduced.

Further, although a double-oven oscillator is used as the first oscillator 14-1 in the embodiments described above, an oscillator with no oven may be used. However, the time until the deviation from the UTC exceeds a value allowed by the system becomes even shorter than in the case in which a single-oven oscillator is used. The cost can be reduced even further.

Although in the exemplary embodiments described above, RS-232C is employed as the communication method between the GPS receiver and the control unit, RS-422, GP-IB, IrDA, IEEE 1394, serial ATA (Serial AT Attachment), PCI Express, or USB (Universal Serial Bus) may be used instead of RS-232C. Further, other parallel communication methods may be used.

Further, although in the exemplary embodiments described above, the first base station 100 and the second base station 200 are mutually connected by a wired communication network 30, they may be connected by wireless communication.

This application is the National Phase of PCT/JP2009/060404, filed Jun. 1, 2009, which is based upon and claims the benefit of priority from Japanese Patent Application No. 2008-162647, filed Jun. 23, 2008, the disclosure of which is incorporated herein in its entirety by reference.

The invention claimed is:

1. A time synchronizer for use in a base station relaying communication between mobile stations under clock synchronization based on a time signal received from any of GPS communication satellites, wherein the time synchronizer comprises:
    a frame timing detection unit detecting timing information of a communication frame received by the communication;
    a GPS receiver which outputs a 1PPS signal and a clock synchronized with the time signal, whereas outputs alarm information when the GPS receiver becomes unable to receive the time signal;
    a CPU circuit unit which, if there is another base station to which handover is possible when the alarm information is output, computes the timing of the 1PPS signal in the other base station based on the timing information from the other base station, and obtains a phase difference based on a comparison result;
    a 1PPS correction circuit unit computing a phase correction amount based on the phase difference;
    a control unit which outputs the 1PPS signal from the GPS receiver, whereas when the alarm information is output, compares the computed 1PPS signal timing with the timing of the 1PPS signal from the GPS receiver, and outputs the comparison result to the CPU circuit unit and also outputs a 1PPS signal phase-corrected by the GPS receiver based on the phase correction amount; and
    a frame generation unit generating a frame for the communication based on the 1PPS signal from the control unit.

2. The time synchronizer as claimed in claim 1, wherein the control unit causes the CPU circuit unit to operate a timer when the alarm information is output, and the CPU circuit unit determines whether or not there is another base station to which handover is possible within a predetermined period of time.

3. The time synchronizer as claimed in claim 2, wherein when there is no other base station to which handover is possible, the CPU circuit unit causes the frame generation unit to stop generation of frames.

4. The time synchronizer as claimed in claim 1, wherein when the phase difference exceeds a predetermined value as a result of the comparison, the control unit causes the CPU circuit unit to stop generation of frames in the frame generation unit.

5. The time synchronizer as claimed in claim 1, wherein the GPS receiver comprises:
- a GPS engine generating a GPS_1PPS upon receiving the time signal from an antenna;
- an oscillator generating the clock to produce the same to the control unit;
- a frequency divider generating the 1PPS signal based on the clock to produce the same to the control unit;
- a phase comparator comparing the phases of the GPS_1PPS and the 1PPS signal to produce a result of the phase comparison; and
- a phase control unit which is connected to the oscillator so that the phase of the clock can be adjusted according to the phase comparison result, exchanges various types of data communication and control commands with the control unit, and if the GPS_1PPS cannot be recognized based on the phase comparison result even after elapse of a predetermined period of time, generates alarm information, determining that the GPS receiver is not being able to receive the time signal.

6. The time synchronizer as claimed in claim 1, wherein the base stations are mutually wire-connected so that transmission time information when acquiring time information of the time signal is obtained from another base station.

\* \* \* \* \*